United States Patent [19]
Nishizawa

[11] 4,333,797
[45] Jun. 8, 1982

[54] REACTOR POWER CONTROL APPARATUS
[75] Inventor: Yasuo Nishizawa, Hitachi, Japan
[73] Assignee: Hitachi, Ltd., Tokyo, Japan
[21] Appl. No.: 147,077
[22] Filed: May 7, 1980
[30] Foreign Application Priority Data
May 11, 1979 [JP] Japan .................................. 54-57045
[51] Int. Cl.³ .............................................. G21C 7/00
[52] U.S. Cl. .................................... 376/210; 376/216; 376/217
[58] Field of Search .......................... 176/20 R, 22, 24
[56] References Cited
U.S. PATENT DOCUMENTS
4,108,720  8/1978  Sato et al. .............................. 176/24
4,236,220  11/1980  Kogami et al. .................... 176/20 R Primary Examiner—Sal Cangialosi
Attorney, Agent, or Firm—Craig and Antonelli

[57] ABSTRACT

A control apparatus for a boiling water reactor includes a monitoring section for monitoring power distribution in the reactor, a core flow control section for controlling the core flow and an arithmetic operational section for calculating change rate of the linear heat generation rate from the output of the monitoring section to thereby cause the core flow to be increased or decreased through the core flow control section when the calculated change rate exceeds a predetermined limit, whereby the increasing rate of the linear heat generation rate of fuel rods is maintained at a value not greater than the limit value. The power distribution monitoring section serves to generalize the current power distribution in the whole core in terms of typical monitoring quantities at selected locations of in-core neutron detectors. A model of change in the monitoring quantities is prepared from the instant values of the typical monitoring quantities on the basis of calculated sensitivity of the reactor with respect to the load change. With the aid of the model, the monitoring quantities are arithmetically determined with a short period during the power changing operation and are then converted to the power distribution in the whole reactor core.

3 Claims, 10 Drawing Figures

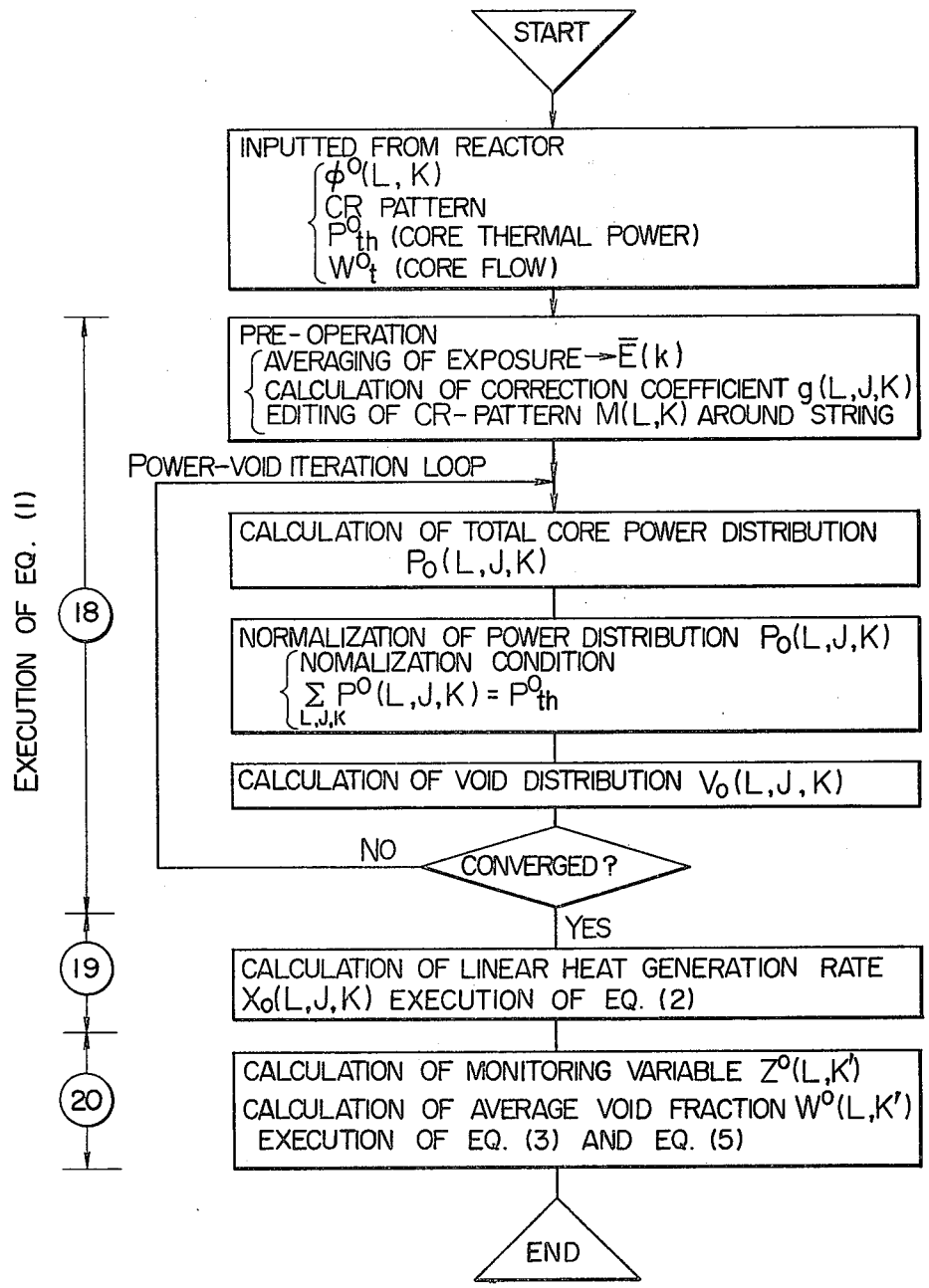

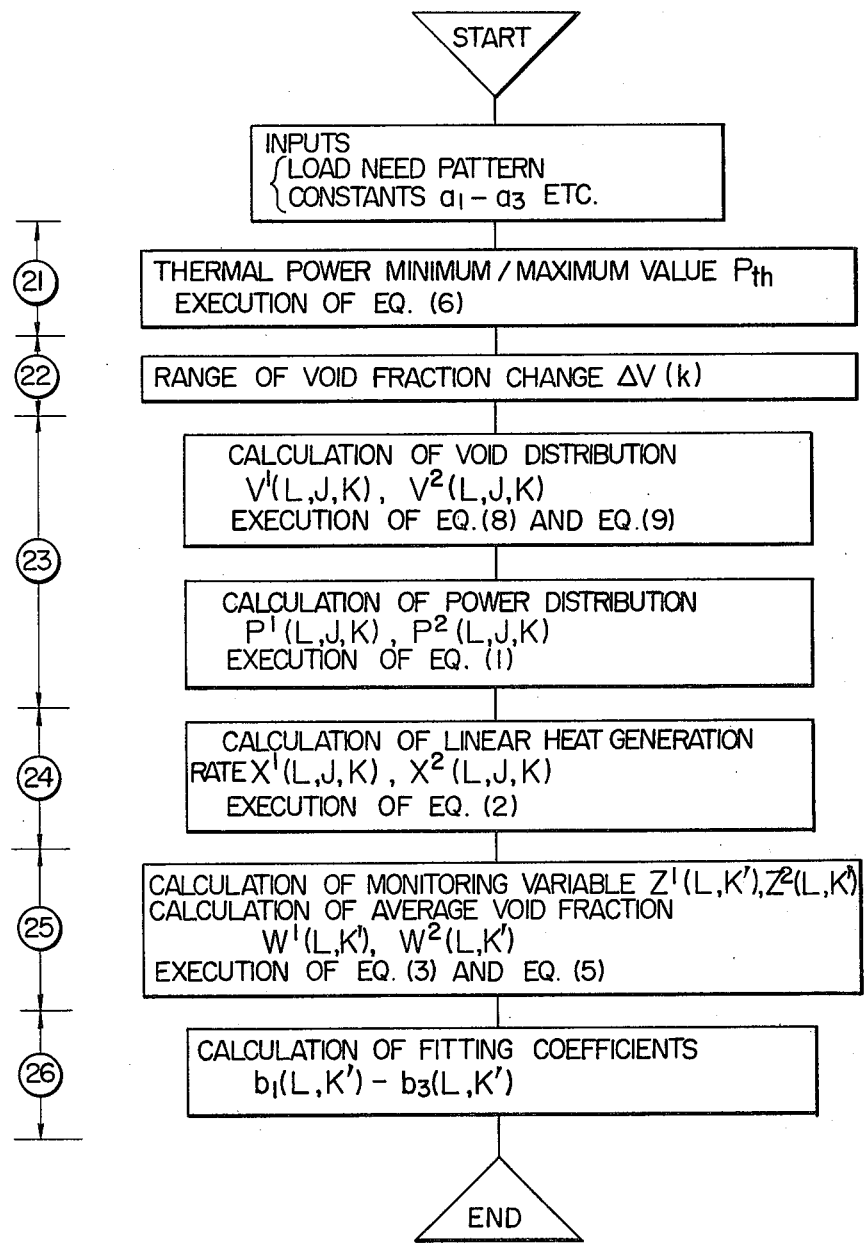

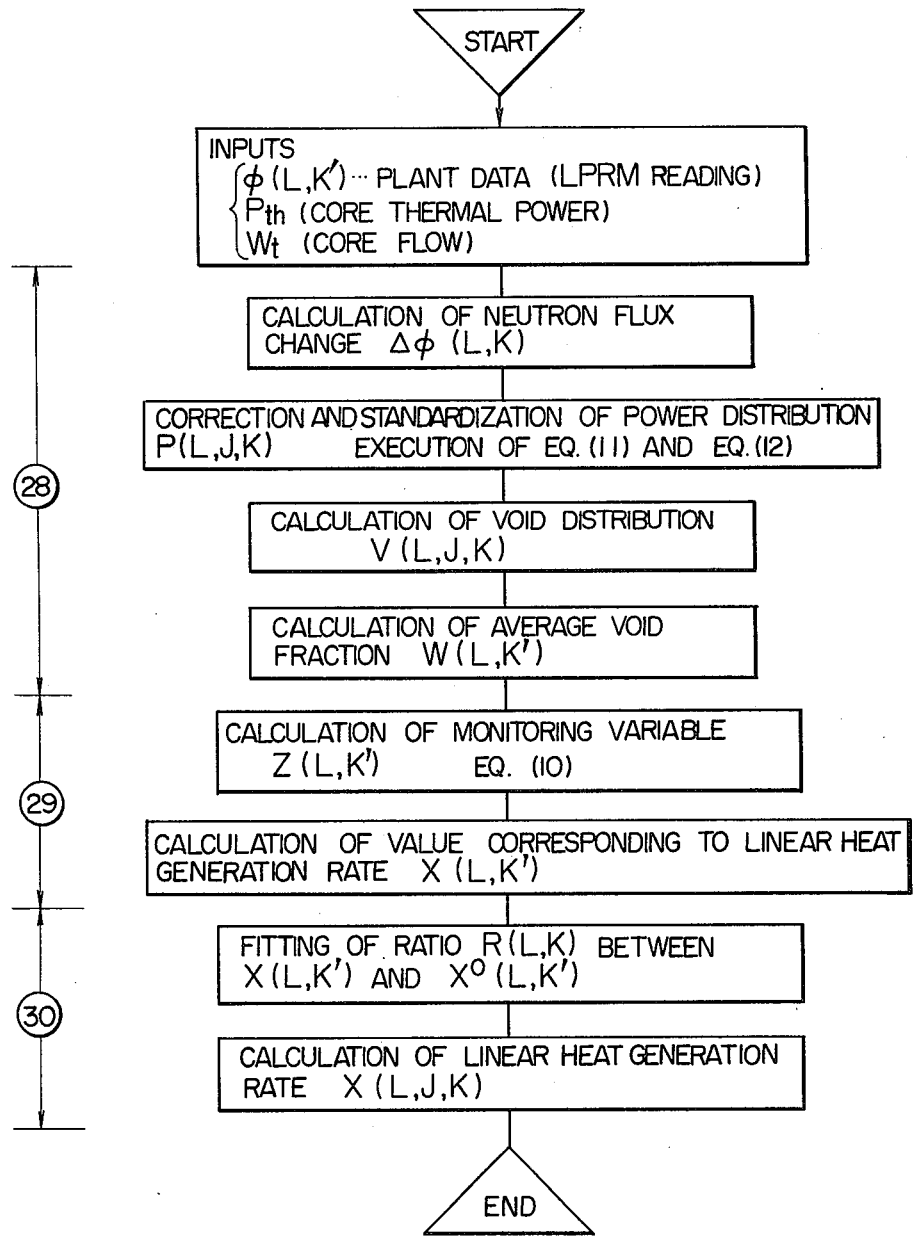

REACTOR POWER CONTROL APPARATUS

BACKGROUND OF THE INVENTION

The present invention relates to a control equipment for controlling power generated by a boiling water reactor.

In recent years, proportion of nuclear power generation to the whole tends to be increased. In the near future, it is expected that operation of a nuclear reactor under a base load will be increasingly replaced by a load following operation in which the reactor power is adjustably controlled in dependence on actual power demand.

When the reactor power is to be changed, it is indispensable to selectively determine the manipulating quantity as well as the manipulating means so that the power distribution in the reactor core meets the imposed constraints. In the case of the load following operation described above, the core conditions will undergo change at a high speed. Consequently, the reactor power must be controlled so as to satisfy the constraints by monitoring the power distribution in the reactor core with a correspondingly shortened period.

In order to reflect the monitored power distribution to the power control, estimation of the power distribution in the reactor core has to be realized in a short time span in the order of a few minutes. Actually, however, it takes ten or more minutes to estimate the power distribution in the whole reactor core. In other words, with the hitherto known procedure for estimating the power distribution of the whole core, it is impossible to reflect the estimation on the power control.

The estimation which takes a lot of time may be explained by the fact that the number of points or locations to be monitored is excessively large. For example, in the case of a nuclear reactor of 1,100,000 KW class, as many as 43 strings of local power range monitors (hereinafter referred to also as LPRM) are distributed at various locations of the reactor cores as viewed in a plan, wherein calculations in accordance with equations (1) and (2) stated hereinafter are executed for all the LPRM strings, which necessarilly results in a great time consumption. In equations (1) and (2), J represents identification number 1 to 4 of four fuel rods (fuel assembly) disposed around each LPRM string, and K represents an index identifying a given one of 24 positions distributed along the fuel rod in the longitudinal or heightwise direction thereof. Accordingly, when the equations (1) and (2) are to be executed for all the points to be monitored (also referred to as the monitoring points), execution of as many as $43 \times 4 \times 24$ times of arithmetic operation is required. Moreover, since equation (1) includes iteration, a lot of time is required even when a computer is used for the calculations.

SUMMARY OF THE INVENTION

An object of the invention is therefore to provide a nuclear reactor power control apparatus which is capable of estimating the power distribution in the whole core at a high speed and reflecting the monitored power distribution on an on-line control for the nuclear reactor.

In order to allow the power distribution in the reactor core to be monitored at a high speed, the invention teaches the following:

(1) Typical monitoring points are set at positions of the in-core neutron flux detectors LPRM for every string. The monitoring quantities representing the states of the associated points are generalized by a reduced number of the typical ones representative of the power distributions at the associated locations.

(2) Calculation for determining the power distribution in the whole core including iteration is executed at a certain time, whereby a standard value for a monitoring quantity is determined on the basis of the result of the above calculation. Monitoring quantities for maximum and minimum loads depending on the load demand are determined to prepare a change model representing correlation among the three monitoring quantities.

(3) With the aid of the change model thus prepared, the monitoring quantities are calculated from the outputs of LPRM readings with a short period and converted into the power distribution in the whole core through interpolation and extrapolation.

BRIEF DESCRIPTION OF THE DRAWINGS

FIGS. 5a to 5c show in flow charts processing steps executed by a digital computer constituting an operational means 100 shown in FIG. 3.

DESCRIPTION OF THE PREFERRED EMBODIMENTS

Figure 1:
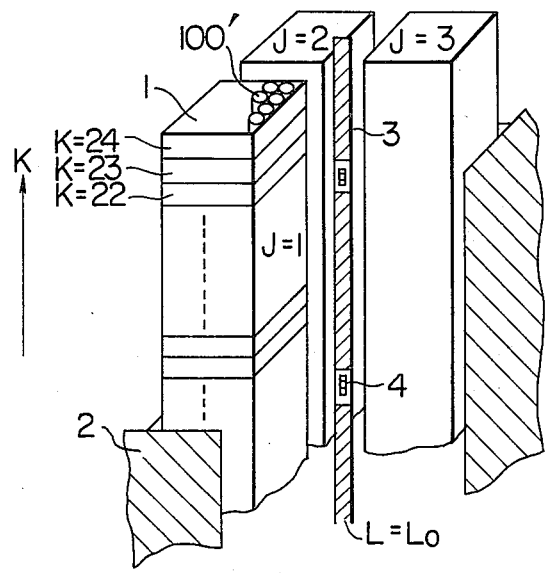
FIG. 1 illustrates in a schematic pictorial view a single LPRM string together with surrounding fuel rods and control rods.
Figure 2:
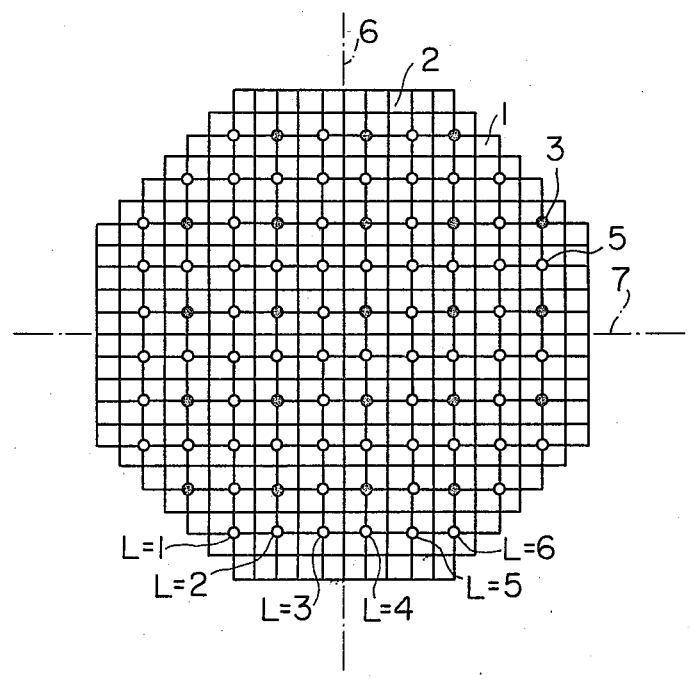
FIG. 2 shows schematically in a plan view disposition or array of LPRM's and other elements.

In the first place, description will briefly be made on a structure of a reactor core of a boiling water reactor or BWR by referring to FIG. 1 which illustrates in a fragmental pictorial view a single LPRM string together with its surrounding elements such as a fuel assembly 1, a control rod 2 and neutron detectors 3 and 4 disposed at positions predetermined relative to each other and additionally by referring to FIG. 2 which illustrates in a plan view the LPRM strings and other elements. It will be noted from FIG. 1 that two different types of neutron detectors are provided in the reactor core. More particularly, one type of the neutron detectors is constituted by a traversing in-core probe 3 (hereinafter referred to as TIP in abridgment) which is adapted to be inserted into the reactor core, as occasion requires, for measuring neutron flux distribution in the axial direction of the core on and along the monitored string. The other type neutron detector is constituted by the local power range monitor or LPRM 4 which is provided stationarily along the string at four locations in the axial direction of the core. The LPRM and TIP are disposed in such an array as indicated by solid circles in black in FIG. 2. Generally, in the case where the reactor core is implemented in a symmetrical structure (i.e. in mirror symmetry or 90°-rotational symmetry relative to axes 6 and 7 of symmetry), it is possible to utilize the output signals from LPRM's and TIP's located at symmetrical positions instead of disposing the LPRM's and TIP's at positions for pseudo monitored strings 5.

Figure 3:
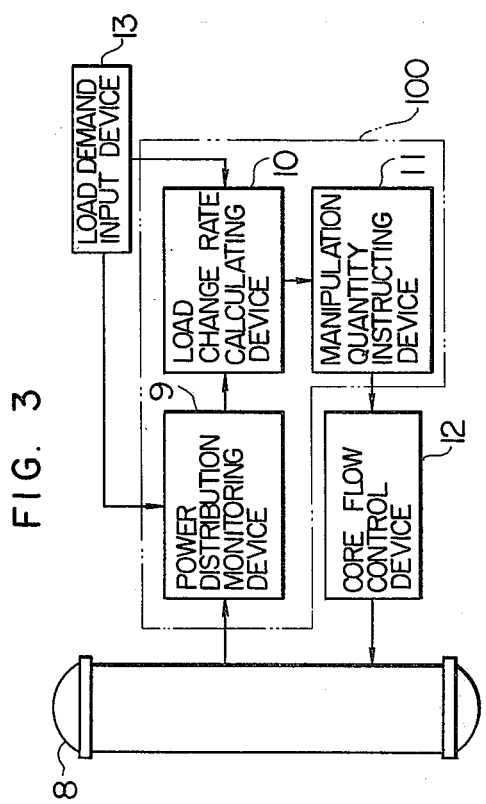
FIG. 3 illustrates in a block diagram connection of a control apparatus according to an embodiment of the invention to a nuclear reactor.

Referring to FIG. 3 which shows schematically a general arrangement of the power control equipment according to an embodiment of the invention, reference numeral 8 denotes a nuclear reactor, 100 denotes an operation means which is composed of, for example, a computer, 12 denotes a core flow control device, and numeral 13 denotes a load demand input device. The operation means 100 is supplied with the output signals from the LPRM's and TIP's disposed within the nuclear reactor 8 and with a load change request signal from the load demand input device 13, which signal represents a change needed for the nuclear reactor. The operation means 100 then determines a maximum linear heat generation rate of the fuel rods in the reactor core by estimating the power distribution in the reactor and produces an output signal representing a reactor power change rate which is such that the maximum linear heat generation rate does not exceed a predetermined value. In practice, the operation means 100 is preferably constituted by a digital computer, which may be considered to include, from a viewpoint of function, a power distribution monitoring device 9, a load change rate calculating device 10, a manipulation quantity instructing device 11 for the convenience of description. Processing operations of the operation means 100 is illustrated in a flow chart shown in FIG. 5. Now, the technical principle of the invention will be described in conjunction with the individual functions of the above-mentioned three devices. The power distribution monitoring device 9 determines the power distribution of the whole reactor core from the neutron flux (i.e. TIP readings and LPRM readings), core thermal power, core flow and the control rod pattern in accordance with equation (1) described hereinafter and arithmetically determines the linear heat generation rate distribution in accordance with equation (2) also described hereinafter. These calculations are periodically executed, whereby the results as obtained are transferred to the load change rate calculating device 10 which in its turn determines arithmetically an instant or current increasing rate of the linear heat generation rate on the basis of the latest data, the next latest data, the thirdly latest data of the linear heat generation rate distribution and so forth. When the instant increasing rate of the linear heat generation rate exceeds a predetermined limit value, the ratio between the instant increasing rate of the linear heat generation rate and the limit or constraint value thereof is determined. Through multiplication of the instant increasing rate in the core thermal power by the thus determined ratio, an increasing rate limit or constraint imposed on the core thermal power is determined. On the other hand, a target increasing rate for the core thermal power is determined on the basis of a load change schedule. More particularly, the target increasing rate can be determined through conversion of the increasing rate represented by the electric output signal transferred from the load demand input device 13 to the increasing rate of the core thermal power. The conversion method to this end will be described hereinafter. When the target increasing rate is higher than the limit or constraint increasing rate described above, increasing of the reactor power in accordance with a load demand will cause the increasing rate of the linear heat generation rate to exceed the limit value. To evade such undesirable situation, one of the limit increasing rate and the target increasing rate described above which has a smaller magnitude is set as a new increasing rate limit or constraint. The instant increasing rate of the core thermal power is subtracted from the newly determined increasing rate limit, whereby resultant difference is transferred to the manipulation quantity instructing device 11 which in turn determines the core flow manipulating quantity by converting the difference between the limit value of the said core thermal power increasing rate and its instant value to a changing rate of the core flow through a predetermined transformation formula and then by adding the resulting core flow changing rate to the instant core flow changing rate. The core flow manipulating quantity is transferred to the core flow control device 12 for controlling the reactor power by changing correspondingly the core flow.

As will be appreciated from the above description, the core thermal power is controlled on the basis of calculation of the power distribution in the whole reactor core in accordance with equations (1) and (2). In this connection, as has been mentioned above, the arithmetic determination of the core power distribution in the whole reactor core as carried out by the blocks shown in FIG. 3 takes a lot of time and thus is not always suited for making the results of the arithmetic operation be reflected on real-time control of the reactor power. With a view to avoiding the inconvenience, according to the invention, the power distribution monitoring device 9 be constituted in such a manner as illustrated by functional blocks in FIG. 4.

Figure 4:
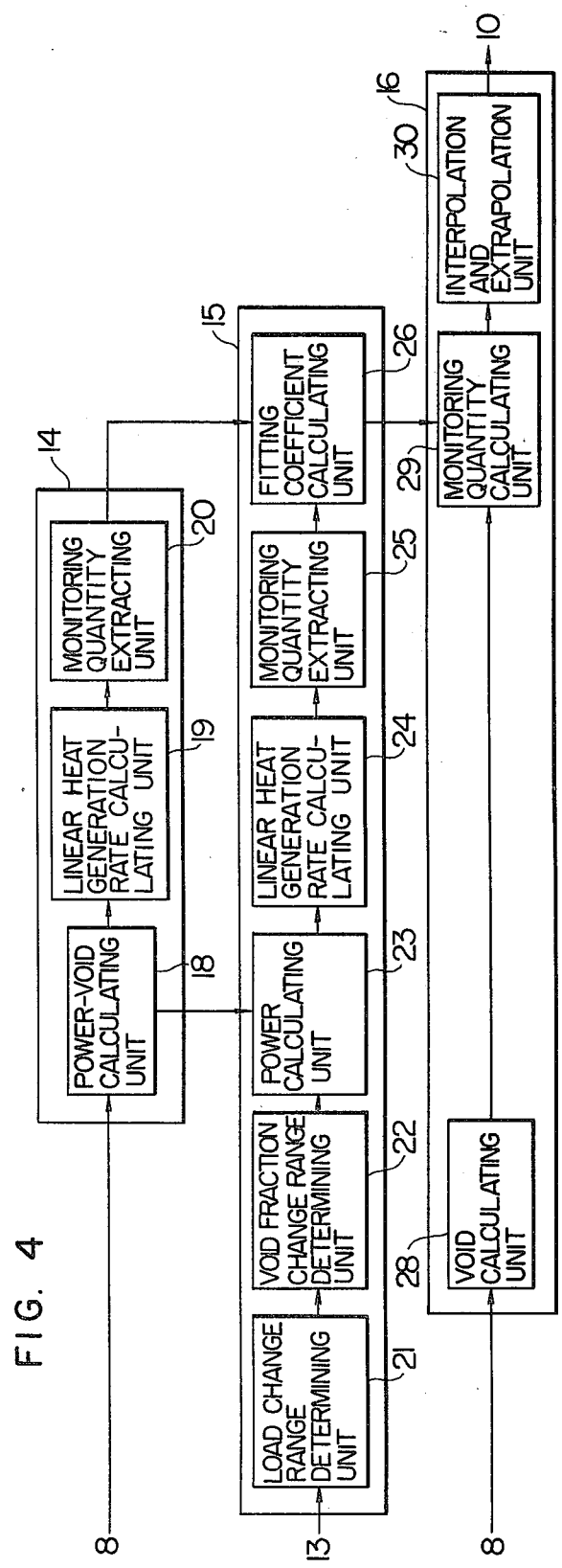
FIG. 4 illustrates in a block diagram operations of the control apparatus according to an embodiment of the invention in terms of different blocks for individual functions.
Figure 6A:
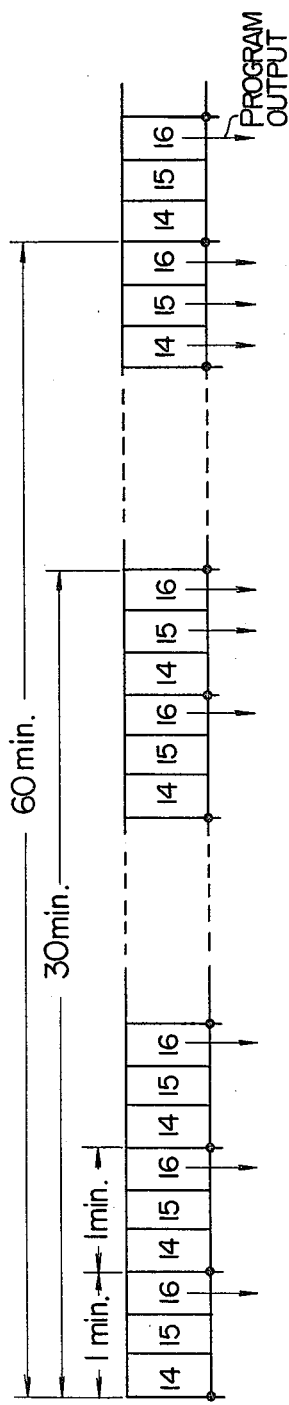
FIGS. 6a to 6c show examples of sequences of the processing steps shown in FIGS. 4 and 5a to 5c when the steps are executed by a single computer.
Figure 6B:
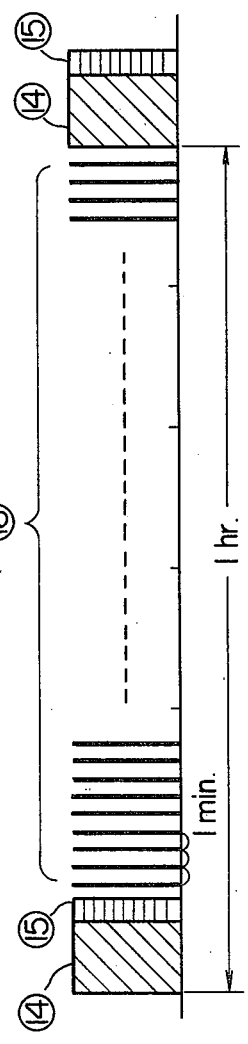
Figure 6C:
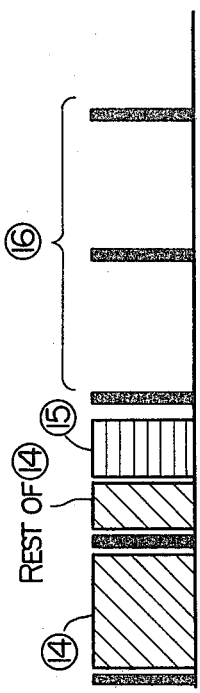

In FIG. 4, a block 14 represents a low-speed arithmetic section, 15 represents a medium-speed arithmetic section and a block 16 represents a highspeed arithmetic section. For example, the low-speed arithmetic section 14 is adapted to produce an output signal once an hour, while the medium-speed arithmetic section 15 produces an output signal once every 30 minutes and the high-speed arithmetic section 16 produces an output signal once a minute. In operation, the low-speed arithmetic section 14 serves to estimate precisely the power distribution of the whole core in an hour for producing a quantity (a monitoring quantity) to which the power distribution states at the individual strings are reduced. On the other hand, the medium-speed arithmetic section 15 serves to determine the monitoring quantities at maximum and minimum electric power levels, respectively, in 30 minutes by making use of a part of the estimation output from the low-speed arithmetic section 14, while the high-speed arithmetic section serves to determine and output instantaneous power distribution at each individual control time point on the basis of the instantaneous LPRM reading and three monitoring quantities. As is illustrated in FIG. 4, three types of processings proceed in parallel with one another with different output periods. To this end, for example, one minute may be divided into three time intervals each of 20 seconds wherein these three time intervals are allotted to the processings executed by the sections 14, 15 and 16, respectively, as shown in FIG. 6a. Thus, at the high-speed arithmetic section 16, the whole processing is completed within 20 seconds and the result is outputted every one minute. On the other hand, the processing to be executed by the medium-speed arithmetic section 15 is carried out peacemeal for the 20 seconds of each one minute, whereby the processing is completed within 10 minutes (=20 seconds ×30). In a similar manner, the final output quantity produced every one hour from the low-speed arithmetic section 14 is obtained through the processing which is carried out peacemeal and takes 20 minutes in total for the completion. The processings by the low-speed arithmetic section on the time-division base such as described above are previously programmed. For the processings executed by the arithmetic sections 14, 15 and 16, programmed processes illustrated in FIG. 6b and 6c may also be adopted. According to the method illustrated in FIG. 6b, a first five-minute interval of one hour is allocated for the processing through the low-speed arithmetic section 14 and a second two-minute interval is allocated for the medium-speed arithmetic section, while during the remaining interval of one hour the processing of the high-speed arithmetic section 16 is executed for every one minute. Accordingly, in the case of the process illustrated in FIG. 6b, it is necessary to hold as the final output from the block 100 a value obtained through the preceding procedure for the first seven-minute interval of one hour. The method illustrated in FIG. 6c comes from a compromise between those shown in FIGS. 6a and 6b. The processings are carried out periodically with the processing by the arithmetic section 16 being most preferential. The non-allocated time in each period is usually idle. However, when need for the processing by the arithmetic section 14 occurs once in an hour, the rest time of an hour is utilized for the processing by the arithmetic section 14 which is followed by the processing through the section 15. According to the method illustrated in FIG. 6c, it is unnecessary to hold the final output for any time period as in the case of the method illustrated in FIG. 6b. Next, processing operations of the arithmetic sections 14, 15 and 16 will be individually described in detail.

I. Low-Speed Arithmetic Section 14

(a) Power-void calculating unit 18:

This unit 18 serves to determine the circumferential power distributions and the void distributions around the all strings in the core on the basis of the output signals produced from the local power range monitors or LPRM's and the tranversing in-core probe TIP's in accordance with equation (1) described below. It should be mentioned here that throughout the following equations an index L is used to represent the string in the reactor core as illustrated in FIG. 2, while J represents the fuel rods disposed to surround a certain string $L_o (L=L_o)$, and K represents position in height of a string in 24 divisions.

$$PJ(K) = \phi(K) \cdot CJ\{M(K), I(K)\} \cdot f_1\{\overline{E}(K), \overline{V}(K)\} \cdot f_2\{\overline{V}(K)\} \cdot f_3\{\overline{E}(K)\} \cdot f_4\{VJ(K)\} \cdot f_5\{EJ(K)\} gJ(K) \quad (1)$$

The above equation describes the power distribution in the direction of the height of a fuel rod when one fuel rod of a certain string is considered (accordingly, L and J being invariable). In equation (1), J: number for a fuel assembly including four fuel rods which surrounds a single monitored string,
K: number representing the axial position,
PJ(K): axial power distribution of a predetermined fuel assembly J,
$\phi(K)$: axial distribution of neutron flux (TIP reading),
M(K): index representing the insertion states of control rods around a monitored string at a height K,
I(K): index representing the fuel rod array around the monitored string,
CJ{M(K), I(K)}: constant determined in dependence on the type of the fuel assembly, the insertion state of the control rods and the type of the fuel rod array,
$\overline{E}(K)$: average axial exposure distribution of a fuel assembly including four fuel rods surrounding the monitored string,
$\overline{V}(K)$: average axial distribution of void fraction in the fuel assembly including four fuel rods surrounding the monitored string,
$f_1\{\overline{E}(K), \overline{V}(K)\}$: polynomial of $\overline{E}(K)$ and $\overline{V}(K)$,
$f_2\{\overline{V}(K)\}$: polynomial of $\overline{V}(K)$,
$f_3\{\overline{E}(K)\}$: polynomial of $\overline{E}(K)$,
VJ(K): axial distribution of void fraction of the fuel assembly J,
$f_4\{VJ(K)\}$: polynomial of VJ(K),
EJ(K): axial exposure distribution of the fuel assembly J determined in proportion to a time integration of PJ(K),
$f_5\{EJ(K)\}$: polynomial of EJ(K), and
gJ(K): correcting coefficient in consideration of the neutron flux gradient in the radial direction.

For coefficients of the polynomials stated above are used those fetched from a file of constants prepared previously in accordance with the insertion states or conditions M(K) of the control rods and the type of the fuel rod array I(K).

In equation (1), the term $\phi(K)$ is obtained by continuing the actual LPRM readings (four values in the heightwise direction) in accordance with the TIP readings (continuous values in the K-direction) in the K-direction. The term gJ(K) is determined on the basis of the gradient appearing in TIP readings in the radial direction. Further, the exposure distribution EJ(K) can be obtained from values of PJ(K) periodically determined through core performance evaluation. The term $\overline{E}(K)$ represents an average value of EJ(K). Accordingly, when the control rod pattern has been once decided, the unknown variables in equation (1) are only PJ(K) and VJ(K) with the mean value of the latter being represented by $\overline{V}(K)$. Iterated calculations are performed for determining these two unknown variables. More specifically, the power distribution PJ(K) is determined from a given initial value of the void distribution VJ(K), which is then followed by determination of VJ(K) as a function of PJ(K). This procedure is iterated until sufficient convergence has been attained, whereupon final solutions for PJ(K) and VJ(K) can be determined. In this connection, it should be noted that the term PJ(K) of equation (1) is so normalized or standardized that the total sum thereof for the whole core is equal to the core thermal power. Now, meaning of equation (1) will be briefly explained from the physical viewpoint. Macrophisically, the reactor thermal power is determined by the number of effective neutrons which take part in promoting the nuclear reaction, while the number of such effective neutrons is determined in dependence on the insertion state of the control rods or the generation state. The same applies to the case where the fuel rods are individually and separately observed. The detection value $\phi(K)$ produced from LPRM's, etc. located at given positions along a certain string reflects the power of the four fuel rods which surrounds the string. Accordingly, the power of the individual fuel rods is estimated from the value $\phi(K)$ in accordance with equation (1) with the void distribution and the insertion state of the fuel rods in the vicinity being taken into consideration. Although the void distribution state can not be actually measured, PJ(K) and VJ(K) may be determined through iterated calculations based on the inversely proportional relationship between the void fraction and the number of neutrons. The processing in accordance with equation (1) described above is executed for all the fuel rods.

(b) Linear heat generation rate calculating unit 19:

With the term "linear heat generation rate" it is intended to mean the power quantity generated by a unit length of fuel pins 100′ of the fuel rod (refer to FIG. 1) in the heightwise or longitudinal direction thereof. In the reactor operation, monitoring and control are made so that the value of the linear heat generation rate does not exceed a limit value. A fuel rod comprises 7×7 or 8×8 fuel pins. The maximum linear heat generation rate X along the height of the individual fuel rod is determined in accordance with equation (2) stated below with the aid of PJ(K) and VJ(K) determined from equation (1).

$$XJ(K) = PJ(K) \cdot DJ\{M(K)\} \cdot f_6\{EJ(K)\} \cdot f_7\{VJ(K)\} \quad (2)$$

where $XJ(K)$: maximum linear heat generation rate distribution of the fuel assembly J in the axial direction, $DJ\{M(K), I(K)\}$: constant determined in dependence on the type of the fuel assembly, the insertion state of the control rods and the type of the fuel rod array, $f_6\{EJ(K)\}$: polynomial of EJ(K), and $f_7\{VJ(K)\}$: polynomial of VJ(K).

(c) Monitoring quantity extracting unit 20:

The values of PJ(K), VJ(K) and XJ(K) obtained from the equations (1) and (2) represent correctly the power distribution of the whole core. However, data amounts to an enormous quantity. More specifically, since the power distribution is in the heightwise (K) direction, a data group available for each of the fuel rods includes 24 sets of data. Accordingly, PJ(K), VJ(K) and XJ(K) are generalized for each of the strings (the number of which is approximately equal to ¼ of that of the fuel rods, as can be seen from FIG. 2) and represented by the monitoring quantity Z(L, K′) representative of the power condition in each of the strings, where K′ represents four height values among 24 values of K (from 1 to 24) which correspond to the four positions of LPRM's along the single string. Further, average void fraction W(L, K′) in the vicinity of LPRM is determined.

$$Z(L, K') = X(L, K')/\phi(L, K') \quad (3)$$

$$X(L, K') = \sum_J XJ(K)_{K=K'}/N_{jK'} \quad (4)$$

$$W(L, K') = \sum_J VJ(K)_{K=K'}/N_{jK'} \quad (5)$$

where $N_{jK'}$: value of XJ(K) present in the vicinity of the string at height K = K′ and considered in calculation, $\sum_J XJ(K)_{K=K'}$:

sum of values of XJ(K) in number of J present in the vicinity of the string at heights K = K′, $\phi(L, K')$: LPRM reading at the positions corresponding to the height K′, X(L, K′): average value of linear heat generation rate at the positions corresponding to the height K′, Z(L, K′): monitoring quantity, $\sum_J VJ(K)_{K=K'}$:

sum of values of VJ(K) in number of J present in the vicinity of the string at height K = K′, and W(L, K′): average value of the linear heat generation rate at the height K′.

Since the monitoring quantity Z(L, K′) and the average linear heat generation rate W(L, K′) take four values, respectively, in correspondence to the four locations of LPRM's, they can be represented by eight values in generalization for the single string. For representation in terms of PJ(K), VJ(K) and XJ(K), values in number of 3×24×J are required for representing the power distribution for the single string.

When equation (1) is substituted for PJ(K) in equation (2), the linear heat generation rate is expressed as a function of φ(K) as follows:

$$XJ(K) = PJ(K) \cdot F_1 \quad (6)$$
$$= \phi(K) \cdot F_1, F_2$$

where $F_1 = DJ\{M(K), I(K)\} \cdot f_6\{EJ(K)\} \cdot f_7\{VJ(K)\}$, and $F_2 = CJ\{M(K), I(K)\} \cdot f_1\{\overline{E}(K), \overline{V}(K)\} \cdot f_2\{V(K)\} \cdot f_3\{\overline{E}(K)\} \cdot f_4\{VJ(K)\} \cdot f_5\{EJ(K)\} \cdot gJ(K)$ As can be seen from comparison of equations (3) and (6), the monitoring quantity Z is a ratio between the number of neutrons φ and the linear heat generation rate X and is identical with generalization of the relation between PJ(K) and XJ(K). In equation (6), the monitoring quantity Z is determined on the assumption that the terms $F_1$ and $F_2$ are invariable. In reality, since these terms $F_1$ and $F_2$ are however functions of the void V, it is impossible to represent correctly the status of the single string only by the monitoring quantity Z. To overcome this difficulty, the average void fraction W given by equation (5) is used as a quantity for correcting the value of the monitoring quantity Z.

The arithmetic operations of the low-speed arithmetic section 14 is executed on the basis of the reactor data fetched during a predetermined period allotted to this arithmetic section 14 (e.g. once in an hour) without resorting to the use of data available at any other time points. The outputs from the low-speed arithmetic section 14 will be distinguished from those of the other arithmetic sections 15 and 16 by attaching an infix "o" in such manner as Z°(L, K′) and W°(L, K′).

II Medium-Speed Arithmetic Section 15

(d) Load change range determining unit 21:

The load change range determining unit 21 is supplied as input thereto with the maximum electric power $P_{emax}$ and the minimum electric power $P_{emin}$ from the load demand input device 13 in relation to the operating conditions and transform them into a maximum value $P_{thmax}$ and a minimum value $P_{thmin}$ of the core thermal power $P_{th}$ in accordance with the following equation:

$$P_{th} = a_1(1 + a_2 P_e + a_3 P_e^2) \quad (7)$$

where $a_1$, $a_2$ and $a_3$ represent constants.

(e) Void fraction change range determining unit 22:

The unit 22 serves to determine the change range $\Delta P_{th}$ of the core thermal power from the maximum value $P_{thmax}$ and the minimum value $P_{thmin}$ of the core thermal power and the core thermal power $P_{th}^o$ at the time point at which the input data is supplied to the arithmetic section 14. The change range $\Delta P_{th}$ of the core thermal power is defined as follows:

$$\Delta P_{th} = M_{ax}\{(P_{thmax} - P_{th}^o), (P_{th}^o - P_{thmin})\} \quad (8)$$

This equation signifies that a larger value of $(P_{thmax} - P_{th}^o)$ and $(P_{th}^o - P_{thmin})$ be selected. Next, the change range $\Delta P_{th}$ of the core thermal power is converted to the void fraction change range $\Delta V(K)$ in the heightwise direction of the fuel rod. For this conversion, a conversion table which has been previously prepared through off-line calculation may be used.

(f) Power calculating unit 23:

By adding and subtracting the void fraction change range $\Delta V(K)$ to and from the void distribution $V^o(L, J, K)$ for the whole reactor core as determined in accordance with equation (1) in the power-void calculating unit 18, void fractions $V^1(L, J, K)$ and $V^2(L, J, K)$ at the time of the predictable maximum power and the minimum power, respectively, are determined in accordance with the following equations (9) and (10):

$$V^1(L, J, K) = V^o(L, J, K) + \Delta V(K) \quad (9)$$

$$V^2(L, J, K) = V^o(L, J, K) - \Delta V(K) \quad (10)$$

Since evry term in equations (9) and (10) is given in terms of percent unit, the value of $V^1(L, J, K)$ is substituted by "1" when it exceeds "1". Similarly, the value of $V^2(L, J, K)$ is substituted by "0" when it becomes negative. The power distributions $P^1(L, J, K)$ and $P^2(L, J, K)$ corresponding to $V^1(L, J, K)$ and $V^2(L, J, K)$ may be determined through substitution of $V^1(L, J, K)$ and $V^2(L, J, K)$ for the former in equation (1). This calculation, being not iterated one, is executed at a high speed.

(g) Linear heat generation rate calculating unit 24 and monitoring quantity extracting unit 25:

These units 24 and 25 serve to transform $P^1(L, J, K)$, $P^2(L, J, K)$, $V^1(L, J, K)$ and $V^2(L, J, K)$ thus obtained to corresponding monitoring quantities and void fractions $Z^1(L, K')$, $W^1(L, K')$, $Z^2(L, K')$ and $W^2(L, K')$.

(h) Fitting coefficient calculating unit 26:

Among the quantities derived in the manner described in the foregoing, the quantities $Z^o(L, K')$ and $W^o(L, K')$ represent accurately the current core state, the quantities $Z^1(L, K')$ and $W^1(L, K')$ represent the core state at the time of maximum power, and the quantities $Z^2(L, K')$ and $W^2(L, K')$ representing the core state at the time of minimum power. Accordingly, there exists some correlation among these combinations of the quantities Z and W. Herein, such correlation is determined in terms of the fitting coefficient. For example, it is assumed that there is such a relation between the quantities Z and W as is given by the following quadratic equation:

$$Z(L, K') = b_1(L, K') + b_2(L, K') \cdot W(L, K') + b_3(L, K')\{W(L, K')\}^2 \quad (11)$$

wherein by substituting the combinations of Z and W corresponding to the three core states described above in equation (11), three equations including $b_1$, $b_2$ and $b_3$ as variables, respectively, are derived and solved for determining the variables $b_1$, $b_2$ and $b_3$. The values $b_1$, $b_2$ and $b_3$ thus determined represent the generalized relationship between Z and W in the expected range of the power change.

III High-Speed Arithmetic Section 16

(i) Void calculation unit 28:

The void fractions at locations (L, K') of LPRM's are determined from the LPRM readings $\phi(L, K')$, the core thermal power $P_{th}$ and the core flow WF as fetched.

(1) The void distribution V(L, J, K) is calculated from the power distribution P(L, J, K) obtained by correction and standardization through equations (12) and (13) of the power distribution $P^o(L, J, K)$ determined by the power-void calculating unit 18.

$$P(L, J, K) = P'(L, J, K) \cdot \frac{\phi^o(L, K) + \Delta\phi(L, K)}{\phi^o(L, K)} \quad (12)$$

The quantity $\Delta\phi(L, K)$ in equation (12) is determined by fitting to the axial direction the difference between the updated LPRM reading $\phi(L, K')$ and the TIP reading $\phi^o(L, K')$ at the LPRM position used in the low-speed arithmetic unit. The fitting equation to this end is in the form of a quinary equation to be fitted to six quantities, i.e. differences $\{\phi(L, K') - \phi^o(L, K')\}$ at four locations of LPRM's and values zero at extrapolating points located above and below the reactor core.

The power distribution P'(L, J, K), though being correctly determined, is a correction of an old distribution P(L, J, K) in consideration of the instant or current power distribution status on the individual strings (said P(L, J, K) being what represents the status before one hour in the worst case). Thus, it may be safe to say that the power distribution P'(L, J, K) represents the current conditions or statuses of the individual strings with a reasonably high accuracy. However, the quantity P'(L, J, K) may contain error, when observed from the viewpoint of the whole reactor core. To obviate the possibility of such error, the power distribution P'(L, J, K) is corrected by a ratio between the thermal power $P_{th}$ and the total sum of $$P'(L, J, K) \text{ i.e., } \sum_{L,J,K} P'(L, J, K)$$

in accordance with the following equation (13).

$$P(L, J, K) = P'(L, J, K) \cdot P_{th} / \sum_{L,J,K} P'(L, J, K) \quad (13)$$

The void distribution V(L, J, K) is determined by substitution of the current power distribution P(L, J, K) in equation (1), whereby the average void fraction W(L, K') at locations K' of the LPRM's can be calculated in accordance with equation (5).

(j) Monitoring quantity calculating unit 29:

The value of the monitoring quantity Z(L, K') is determined from the average void fraction W(L, K') in accordance with equation (11). The value of the monitoring quantity thus determined is converted to the corresponding values of the linear heat generation rate X(L, K') at the LPRM locations by multiplying the monitoring quantity Z by the LPRM readings $\phi(L, K')$.

(k) Interpolation and extrapolation unit 30:

Ratio between X(L, K') thus determined and X⁰(L, K') determined by the monitoring quantity extracting unit 20 in accordance with equation (4) is fitted to the axial direction to determine the ratio R(L, K), which is then multiplied by X⁰(L, J, K) determined by the linear heat generation rate calculating unit 19 to thereby determine the linear heat generation rate X(L, J, K) of the fuel pin which is now transferred to the load change rate calculating unit 10.

The various units shown in block in FIG. 4 operate in the manner described above to determine the power distribution in the reactor core. As will be appreciated from the foregoing, operational processings performed by the high-speed arithmetic section 16 for determining the power distribution in the whole reactor core need only four fundamental rules of arithmetic except for the calculations of the void distribution and the axial fitting operation. Power allocation in accordance with equation (1) including the power-void iteration and the calculation of the linear heat generation rate in accordance with equation (2) are excluded from the operations of the high-speed arithmetic section. As a consequence, time required for the calculations or the arithmetic operation is remarkably reduced, which makes it possible to activate the high-speed arithmetic section at a high speed.

The invention has now provided an improved control apparatus for a boiling water reactor or BWR which is capable of controlling the reactor power so that the power distribution meets the constraints by means of the core flow control means while monitoring the power distribution in the reactor core and which can adopt the high-speed monitoring method for monitoring the power distribution, as occasion requires.

I claim:

1. A reactor power control apparatus for a nuclear reactor, comprising core flow control means for controlling a core flow within the reactor to thereby control reactor power, and arithmetic operational means for determining the linear heat generation rate in the longitudinal direction of fuel rods in the reactor from input quantities available from neutron detectors provided at predetermined locations in said reactor and producing a core flow setting signal to be supplied to said core flow control means so that change rate of said linear heat generation rate does not exceed a limit change rate, said arithmetic operational means comprising:

first means for determining a monitoring quantity represented by a ratio between the linear heat generation rate and neutron flux at monitoring points within said reactor and for determining a void fraction at said monitoring points;

second means for receiving as input thereto scheduled values of maximum and minimum electric powers expected in succeeding operation of said reactor to determine said monitoring quantities and said void fractions at said monitoring points which correspond to said maximum electric power and said minimum electric power, respectively, to thereby derive a relation among three sets of said monitoring quantities and said void fractions;

third means for determining the void fraction from the instant neutron flux and determining the linear heat generation rate from the just above-mentioned void fraction and neutron flux in accordance with said relation for every control period; and fourth means for producing said core flow setting signal on the basis of said linear heat generation rate.

2. A reactor power control apparatus as set forth in claim 1, wherein at least said third means is adapted to produce a final output signal for every control period, while said first and second means are adapted to produce respective final outputs once for every predetermined period having a longer duration than that of said control period.

3. A reactor power control apparatus as set forth in claim 1, wherein said first means is further adapted to execute iterated calculations for determining the power distribution and the void fraction.

* * * * *